United States Patent
Bougaev et al.

(10) Patent No.: US 8,601,212 B2
(45) Date of Patent: Dec. 3, 2013

(54) SCHEDULING READ OPERATIONS DURING DRIVE RECONSTRUCTION IN AN ARRAY OF REDUNDANT DISK DRIVES

(75) Inventors: Anton A. Bougaev, La Jolla, CA (US); David K. McElfresh, San Diego, CA (US); Aleksey M. Urmanov, San Diego, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 13/542,298

(22) Filed: Jul. 5, 2012

(65) Prior Publication Data

US 2012/0272019 A1 Oct. 25, 2012

Related U.S. Application Data

(62) Division of application No. 12/167,729, filed on Jul. 3, 2008, now Pat. No. 8,239,623.

(51) Int. Cl.
*G06F 12/00* (2006.01)
*G06F 13/00* (2006.01)

(52) U.S. Cl.
USPC ............ 711/114; 711/100; 711/111; 711/154

(58) Field of Classification Search
USPC .................................. 711/100, 111, 114, 154
See application file for complete search history.

(56) References Cited

U.S. PATENT DOCUMENTS

| | | | |
|---|---|---|---|
| 6,895,468 B2 * | 5/2005 | Rege et al. ..................... | 711/114 |
| 7,434,095 B2 | 10/2008 | Tanaka et al. | |
| 7,814,272 B2 | 10/2010 | Barrall et al. | |
| 8,301,857 B2 * | 10/2012 | Ogasawara .................... | 711/170 |
| 2002/0103983 A1 * | 8/2002 | Rege et al. ..................... | 711/162 |
| 2006/0085595 A1 * | 4/2006 | Slater ............................ | 711/114 |
| 2006/0236056 A1 * | 10/2006 | Nagata .......................... | 711/165 |

* cited by examiner

*Primary Examiner* — Tuan Thai
(74) *Attorney, Agent, or Firm* — Park, Vaughan, Fleming & Dowler LLP; Anthony P. Jones

(57) ABSTRACT

Some embodiments of the present invention provide a system that schedules read operations for disk drives in a set of disk drives. During operation, the system monitors a write rate for write operations to a given disk drive in the set of disk drives, wherein vibrations generated by the read operations directed to disk drives in the set of disk drives are transmitted to the given disk drive. Then, the read operations for disk drives in the set of disk drives are scheduled based on the write rate for the given disk drive, thereby limiting interference between the write operations and the vibrations generated by the read operations.

6 Claims, 2 Drawing Sheets

SCHEDULING READ OPERATIONS DURING DRIVE RECONSTRUCTION IN AN ARRAY OF REDUNDANT DISK DRIVES

RELATED CASE

This application is a divisional application of, and hereby claims priority under 35 U.S.C. §120 to, pending U.S. patent application Ser. No. 12/167,729, entitled "Scheduling Read Operations during Drive Reconstruction in an Array of Redundant Disk Drives," by Anton A. Bougaev, David K. McElfresh, and Aleksey M. Urmanov, which was filed on 3 Jul. 2008, and which is herein incorporated by reference.

BACKGROUND

1. Field

The present invention relates to techniques for controlling disk drives. More specifically, the present invention relates to a method and apparatus for scheduling read operations for disk drives in a set of disk drives.

2. Related Art

Reconstruction of a missing disk drive in a Redundant Array of Inexpensive Disks (RAID) can be a time-consuming process. Typically, the write operations performed during reconstruction of the missing disk drive comprise sequential write operations. While sequential write operations can have a relatively high data rate compared to other write operations, the data rate of sequential write operations may be substantially reduced by a number of factors, including the scheduling of intervening read operations during the reconstruction process. This reduced data rate can significantly increase the reconstruction time, which increases the risk of losing data if a second drive fails while the missing drive is being reconstructed.

Hence, what is needed is a method and apparatus for scheduling read operations for disk drives in an array of redundant disk drives during reconstruction of a missing disk drive in the array.

SUMMARY

Some embodiments of the present invention provide a system that schedules read operations for disk drives in a set of disk drives. During operation, a write rate for write operations to a given disk drive in the set of disk drives is monitored, wherein vibrations generated by the read operations directed to disk drives in the set of disk drives are transmitted to the given disk drive. The read operations for disk drives in the set of disk drives are then scheduled based on the write rate for the given disk drive, thereby limiting interference between the write operations and the vibrations generated by the read operations.

Some embodiments further comprise monitoring a total read rate for the set of disk drives, wherein scheduling read operations for disk drives in the set of disk drives based on the write rate for the given disk drive includes controlling the total read rate for the set of disk drives to attempt to equilibrate the total read rate and the write rate.

Some embodiments further comprise monitoring a read rate for disk drives in the set of disk drives, wherein scheduling read operations for disk drives in the set of disk drives based on the write rate for the given disk drive includes controlling the read rate for disk drives in the set of disk drives to attempt to equilibrate a total read rate and the write rate.

In some embodiments, the read operations include random read operations, and the write operations include sequential write operations.

In some embodiments, the set of disk drives includes an array of redundant disk drives.

Some embodiments of the present invention provide a system that schedules read operations for disk drives in an array of redundant disk drives during reconstruction of a missing disk drive in the array. During operation, the system commences reconstructing the missing disk drive using information retrieved from other disk drives in the array. Then, while the missing disk drive is being reconstructed, the system limits read operations to the array, thereby limiting interference between the read operations and the reconstruction.

In some embodiments, the interference between the read operations and the reconstruction includes interference between vibrations generated by read operations directed to disk drives in the array and write operations associated with reconstruction of the missing disk drive.

In some embodiments, reconstructing the missing drive includes monitoring a read rate for disk drives in the array, monitoring a write rate for the reconstruction of the missing disk drive, and scheduling the read operations for disk drives in the array based on the write rate for the reconstruction.

In some embodiments, the read rate for the disk drives includes a total read rate for the disk drives, and scheduling the read operations for disk drives in the array based on the write rate for the reconstruction includes controlling the total read rate for disk drives in the array during reconstruction to attempt to equilibrate the total read rate and the write rate for the reconstruction of the missing disk.

In some embodiments, monitoring the read rate for disk drives in the array includes monitoring a read rate for each disk drive in the array, and controlling the total read rate includes controlling the read rate for each disk drive in the array.

In some embodiments, reconstructing the missing disk drive includes performing sequential write operations to a replacement disk drive.

In some embodiments, the read operations to the array include random read operations.

In some embodiments, the array of redundant disk drives is a Redundant Array of Inexpensive Disks (RAID).

In some embodiments, disk drives in the array of redundant disk drives include hard disk drives.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
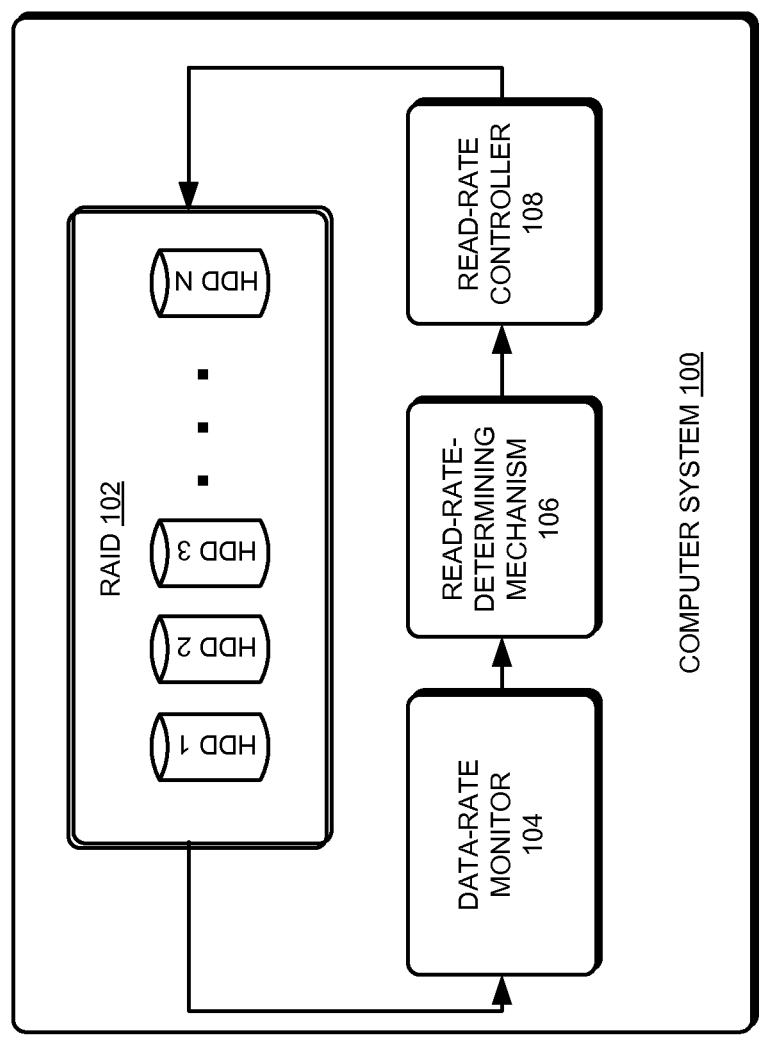
FIG. 1 illustrates a system for scheduling read operations for disk drives in an array of redundant disk drives during reconstruction of a missing disk drive in the array.

FIG. 1 illustrates a system for scheduling read operations for disk drives in an array of redundant disk drives during reconstruction of a missing disk drive in the array. Computer system 100 includes Redundant Array of Inexpensive Disks (RAID) 102, data-rate monitor 104, read-rate-determining mechanism 106, and read-rate controller 108.

RAID 102 includes N hard disk drives (HDDs), wherein HDD 1, HDD2, HDD3, and HDD N are illustrated in FIG. 1. Note that RAID 102 can implement well-known redundant RAID storage techniques. In some embodiments, HDDs in RAID 102 can include storage devices other than HDDs which are presently known. In some embodiments RAID 102 is replaced by an array of redundant disk drives implementing a redundant storage technique other than well-known RAID techniques.

Computer system 100 can include but is not limited to a server, a server blade, a datacenter server, an enterprise computer, a field-replaceable unit that includes a processor, or any other computation system that includes one or more processors and one or more cores in each processor.

Data-rate monitor 104 can be any device that can monitor the read rate and write rate of HDDs in RAID 102. Data-rate monitor 104 can be implemented in any combination of hardware and software. In some embodiments, data-rate monitor 104 operates on one or more service processors. In other embodiments, data-rate monitor 104 operates on a separate computer system.

Read-rate-determining mechanism 106 can be any device that can receive input from data-rate monitor 104 and determine a read-rate for HDDs in RAID 102. Read-rate-determining mechanism 106 can be implemented in any combination of hardware and software. In some embodiments, read-rate-determining mechanism 106 operates on one or more service processors. In other embodiments, read-rate-determining mechanism 106 operates on a separate computer system.

Read-rate controller 108 can be any device that can receive input from read-rate-determining mechanism 106 and control the read rate for HDDs in RAID 102. Read-rate controller 108 can be implemented in any combination of hardware and software. In some embodiments, read-rate controller 108 operates on one or more service processors. In other embodiments, read-rate controller 108 operates on a separate computer system.

Some embodiments of the present invention operate as follows. When one HDD from RAID 102 is missing for any reason, including but not limited to removal of the HDD due to failure or maintenance, a replacement HDD is activated. Since RAID 102 implements a redundant RAID storage method, no information is lost when one HDD is missing, and reconstructing the missing HDD on the replacement HDD will restore the original redundancy of RAID 102. During the reconstruction process, data is read from HDDs in RAID 102 and written to the replacement HDD. In some embodiments, during the reconstruction process, the read operations for HDDs in RAID 102 include random read operations and the write operations for the replacement HDD include sequential read operations.

Data-rate monitor 104 monitors the read-data rate for each HDD in RAID 102 and the write-data rate for the replacement HDD. Data-rate monitor 104 then transmits the monitored read and write rates to read-rate-determining mechanism 106. Read-rate-determining mechanism 106 then schedules read operations for each HDD in RAID 102 based on the interference between the read operations of HDDs in RAID 102 and the write operations of the replacement HDD during reconstruction. In some embodiments, the interference between the read operations of HDDs in RAID 102 and the write operation of the replacement HDD during reconstruction can include but is not limited to vibrations generated by read operations of HDDs in RAID 102 that are transmitted to the replacement HDD during write operations, and read operations directed to the replacement HDD that interrupt write operations on the replacement HDD.

In some embodiments, read-rate-determining mechanism 106 determines a read rate for each HDD in RAID 102 based on the interference of the read rate for that HDD with the write rate for the replacement HDD. The interference can be determined through prior testing, through analysis of the data gathered by data-rate monitor 104 before or during the reconstruction, or through any other suitable method. In some embodiments, a subset of HDDs in RAID 102 are treated similarly and all HDDs in the subset are scheduled in the same way. For example, in some embodiments, all HDDs may be scheduled to read for a first predetermined period of time and then stop reading for a second predetermined time. In some of these embodiments, all the HDDs are scheduled to read for 0.2 seconds and then sleep (not read) for 0.2 seconds. The predetermined time periods can be changed by read-rate-determining mechanism 106 based on the read-rates and write-rates from data-rate monitor 104.

In some embodiments, read-rate determining mechanism attempts to schedule the read-rate for HDDs in RAID 102 so that the total read rate for all HDDs in RAID 102 is equal to the write rate for the reconstruction of the missing HDD. In some embodiments, read-rate-determining mechanism 106 continuously adjusts the scheduling strategy to minimize the time it takes to reconstruct the replacement HDD.

Read-rate controller 108 then limits the read rate of HDDs in RAID 102 using the schedule from read-rate-determining mechanism 106. In some embodiments, read-rate controller 108 controls the amount of reading each HDD performs and limits the rate of read requests using an I/O scheduling mechanism which can include but is not limited to sending STOP/CONT commands to the processes performing reads, or any other command or process available in computer system 100 to schedule or control read operations for HDDs in RAID 102.

Figure 2:
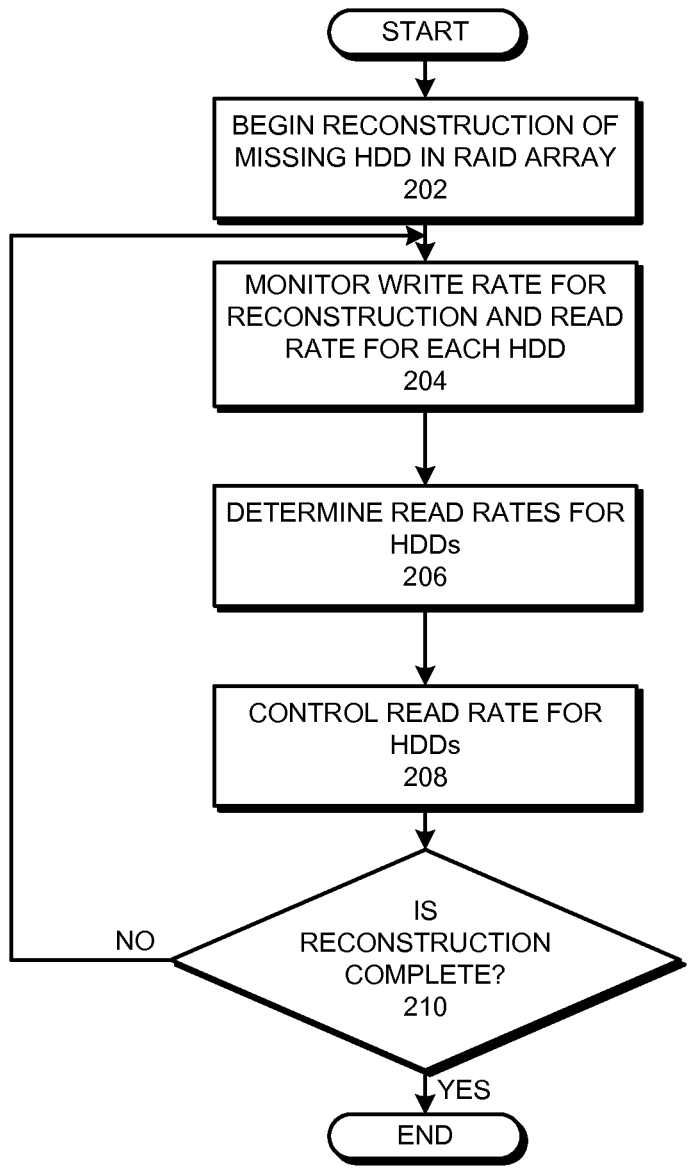
FIG. 2 presents a flowchart illustrating a process for scheduling read operations for disk drives in an array of redundant disk drives during reconstruction of a missing disk drive in the array.

FIG. 2 presents a flowchart illustrating a process for scheduling read operations for HDDs in an array of redundant HDDs during reconstruction of a missing HDD in the array. First, reconstruction of a missing HDD in a RAID is begun (step 202). During the reconstruction process, the write rate for the HDD being reconstructed and the read rate for each HDD in the RAID are monitored (step 204). Then, the system determines what the read rate should be for each HDD in the RAID (step 206).

In some embodiments, the determination of the read rate for an HDD is based on the interference of the read rate for that HDD with the write rate for the reconstruction of the missing HDD. The interference can be determined based on prior testing, analysis of read rate and write rate data gathered before reconstruction began or during step 204, or any other suitable method to determine the effect of the read rate for HDD in the RAID on the write rate for the reconstruction of the missing HDD.

The read rate on each HDD is then controlled (step 208) as determined in step 206. Then, if the reconstruction of the missing HDD is not complete (step 210), the process continues to step 204. If the reconstruction of the missing HDD is complete (step 210), then the process ends.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for scheduling read operations for disk drives in a set of disk drives, the method comprising:
   monitoring a write rate for write operations to a given disk drive in the set of disk drives, wherein vibrations generated by the read operations directed to disk drives in the set of disk drives are transmitted to the given disk drive; and
   scheduling the read operations for disk drives in the set of disk drives based on the write rate for the given disk drive, thereby limiting interference between the write operations for the given disk drive and the vibrations generated by the read operations for the disk drives.

2. The method of claim 1, further comprising:
   monitoring a total read rate for the set of disk drives, wherein scheduling read operations for disk drives in the set of disk drives based on the write rate for the given disk drive includes controlling the total read rate for the set of disk drives to attempt to equilibrate the total read rate and the write rate.

3. The method of claim 1, further comprising:
   monitoring a read rate for disk drives in the set of disk drives, wherein scheduling read operations for disk drives in the set of disk drives based on the write rate for the given disk drive includes controlling the read rate for disk drives in the set of disk drives to attempt to equilibrate a total read rate and the write rate.

4. The method of claim 1,
   wherein the read operations include random read operations; and
   wherein the write operations include sequential write operations.

5. The method of claim 1, wherein the set of disk drives includes an array of redundant disk drives.

6. The method of claim 1, further comprising:
   scheduling read operations for the given disk drive based on the write rate for the given disk drive so that read operations directed to the given disk drive that interrupt write operations for the given disk drive are limited.

* * * * *